United States Patent [19]

Alexander et al.

[11] Patent Number: 4,991,707
[45] Date of Patent: Feb. 12, 1991

[54] BODYSIDE PANEL HANDLING CONVEYOR

[75] Inventors: Robert O. Alexander, West Bloomfield; Michael R. Dugas, Brighton; Mark W. Hazelton, West Bloomfield; Patrick J. Kenny, Detroit, all of Mich.

[73] Assignee: Progressive Tool & Industries Co., Southfield, Mich.

[21] Appl. No.: 464,147

[22] Filed: Jan. 12, 1990

[51] Int. Cl.$^5$ ............................................. B65G 37/00
[52] U.S. Cl. ............................... 198/346.1; 198/345.1; 198/462.2; 29/430; 104/103
[58] Field of Search ................................. 104/137, 103; 198/346.1, 345.1, 346.2; 29/430, 783

[56] References Cited

U.S. PATENT DOCUMENTS

| | | | |
|---|---|---|---|
| 3,094,941 | 6/1963 | Hellner | 104/103 X |
| 3,144,836 | 8/1964 | Cripe et al. | 104/103 |
| 3,968,559 | 7/1976 | Karlsson | 29/430 |
| 4,162,387 | 7/1979 | De Candia | 219/79 |
| 4,382,500 | 5/1983 | Oyama et al. | 198/346 |
| 4,538,044 | 8/1985 | Kadowaki et al. | 219/80 |
| 4,589,184 | 5/1986 | Asano et al. | 29/430 |
| 4,589,199 | 5/1986 | Ohtaki et al. | 29/714 |
| 4,606,488 | 8/1986 | Yanagisawa | 228/45 |
| 4,646,915 | 3/1987 | Ohtaki et al. | 198/345 |
| 4,659,895 | 4/1987 | Di Rosa | 219/79 |
| 4,667,866 | 5/1987 | Tobita et al. | 228/4.1 |
| 4,670,961 | 6/1987 | Fontaine et al. | 29/429 |
| 4,682,722 | 7/1987 | Bossotto et al. | 228/41 |
| 4,736,515 | 4/1988 | Catena | 29/714 |
| 4,738,022 | 4/1988 | Sakamoto et al. | 29/712 |
| 4,757,608 | 7/1988 | Ochi | 29/787 |

Primary Examiner—H. Grant Skaggs
Assistant Examiner—Keith L. Dixon
Attorney, Agent, or Firm—Basile and Hanlon

[57] ABSTRACT

A carrier is mounted for movement along a conveying path defined by a pair of conveying rails, one of which has a relatively short gap at a work station. A manipulator device is located at the work station and includes a relatively short conveying rail section which may selectively located to span the gap in the one rail or located in a position displaced from the rail. An article support frame is mounted upon the carrier for pivotal movement about an axis parallel to the rails between conveying position and a transfer position. A rail gripping device fixed to the support frame slides along the one rail to support the support frame in its conveying position during movement of the carrier along the rails. When the carrier arrives at the work station, the gripping device engages the short rail section of the manipulator which is then actuated to displace the rail section from the rail to pivot the support frame to its transfer position in which an article supported on the support frame may be processed by tooling located at the work station.

12 Claims, 3 Drawing Sheets

BODYSIDE PANEL HANDLING CONVEYOR

BACKGROUND OF THE INVENTION

The present invention relates to conveying apparatus for handling relatively large articles, such as automotive body side panels which are conveyed along a production line to a series of work stations.

The vast majority of present day automobiles are of a so called unitized body construction in which the vehicle body is made up of stamped sheet metal components, i.e. roof panel, floor panel, side panels, etc., which are assembled to each other by welding. Particularly in the case of body side panels, additional structural components, such as mounting brackets, door lock and hinge reinforcements, etc. are assembled on to the panel prior to its subsequent assembly to the other components of the vehicle body. The assembly of these additional components to the panel is typically accomplished at a series of work stations disposed along a conveying line which transfers the panels from station to station.

Most, if not all, of these work stations are automated, and automated assembly of this type requires a precise positioning of the panel relative to the automated equipment so that the various parts are precisely located on the panel. Achievement of such alignment and access to the desired locations on the panel by the assembly tooling cannot always be achieved while the panel is supported upon the conveyor, and at the typical work station, a stationary work frame especially designed to support the panel in alignment with the tooling is employed to support the panel while the particular assembly of operation is performed. This in turn involves a transfer of the panel from the conveyor to the work frame to perform the assembly operation and the subsequent transfer of the panel back from the work frame to the conveyor after the operation is completed.

To accomplish such a transfer, a transfer device must be accurately aligned both with the conveyor and with the work frame upon which the body panel is positioned in alignment with the automated tooling. In that the typical conveyor will extend for one hundred feet or more and pass several work stations, precise alignment of all portions of the conveying path with a fixed reference point is difficult to achieve in practice. In so far as the path of movement of parts or panels along the conveyor is concerned, precise positioning is of little concern during transit of the panels between successive work stations. However, at arrival at a work station, the panel must be precisely positioned relative to the transfer mechanism which in turn must be precisely positioned relative to the work frame.

The present invention is directed to a transfer device or manipulator for transferring a panel from the conveying path to and from a stationary work frame at a work station which assures placement of the panel on the stationary work frame within the desired degree of precision by means of a relatively simple self aligning mechanism.

SUMMARY OF THE INVENTION

In accordance with the present invention, a panel carrier is mounted for movement along a fixed conveying path defined by a pair of conveyor rails. The carrier includes a main carrier frame mounted on the two conveyor rails as by rollers for longitudinal movement only relative to the rails. A panel support frame is mounted on the main carrier frame for pivotal movement relative to the main frame about an axis extending parallel to the rails. The panel support frame includes a rigidly mounted rail gripping device which engages one of the two conveyor rails, and when so engaged locates the panel support frame in a panel conveying position.

At a work station, that conveying rail upon which the rail gripping member of the panel support frame rides is formed with a relatively short gap which is normally bridged by a relatively short movable rail section which constitutes part of a manipulator employed to pivot the panel support frame from its normally assumed conveying position to a transfer position in which a panel carried by the panel support frame engages a stationary work frame at the work station so that support of the panel may be transferred from the panel support frame to or from the stationary work frame.

The manipulator includes a fixed frame which is fixedly mounted with respect to the conveying rails and supports a manipulating member for movement along a fixed path established by a pair of cam tracks on the fixed manipulator frame which receive rollers mounted on the manipulator member. The relatively short movable rail section referred to above is fixedly and rigidly mounted on the movable manipulator member, the manipulator member being drive between two end limits by a hydraulic cylinder. When the manipulator member is at one end limit, the relatively short rail section carried by the manipulator member is positioned in the gap in the main conveyor rail to bridge the gap and form a substantially continuous conveyor rail. With the short rail section located in this position, a carrier may be advanced along the conveyor rails until the rail gripping member on the panel support frame is located on the relatively short rail section of the manipulator. The hydraulic cylinder of the manipulator is then actuated to shift the manipulator member and its short rail section to its opposite end limit of movement, this movement of the rail section being transmitted through the rail gripper into pivotal movement of the panel support frame relative to the carrier to swing the attached body panel into operative relationship with the stationary work frame at the work station. The rail gripping member and relatively short rail section may be formed with a key and key way to lock the gripping member to the rail section during this pivotal movement.

Other objects and features of the invention will become apparent by reference to the following specification and to the drawings.

DESCRIPTION OF THE PREFERRED EMBODIMENT

Figure 1:
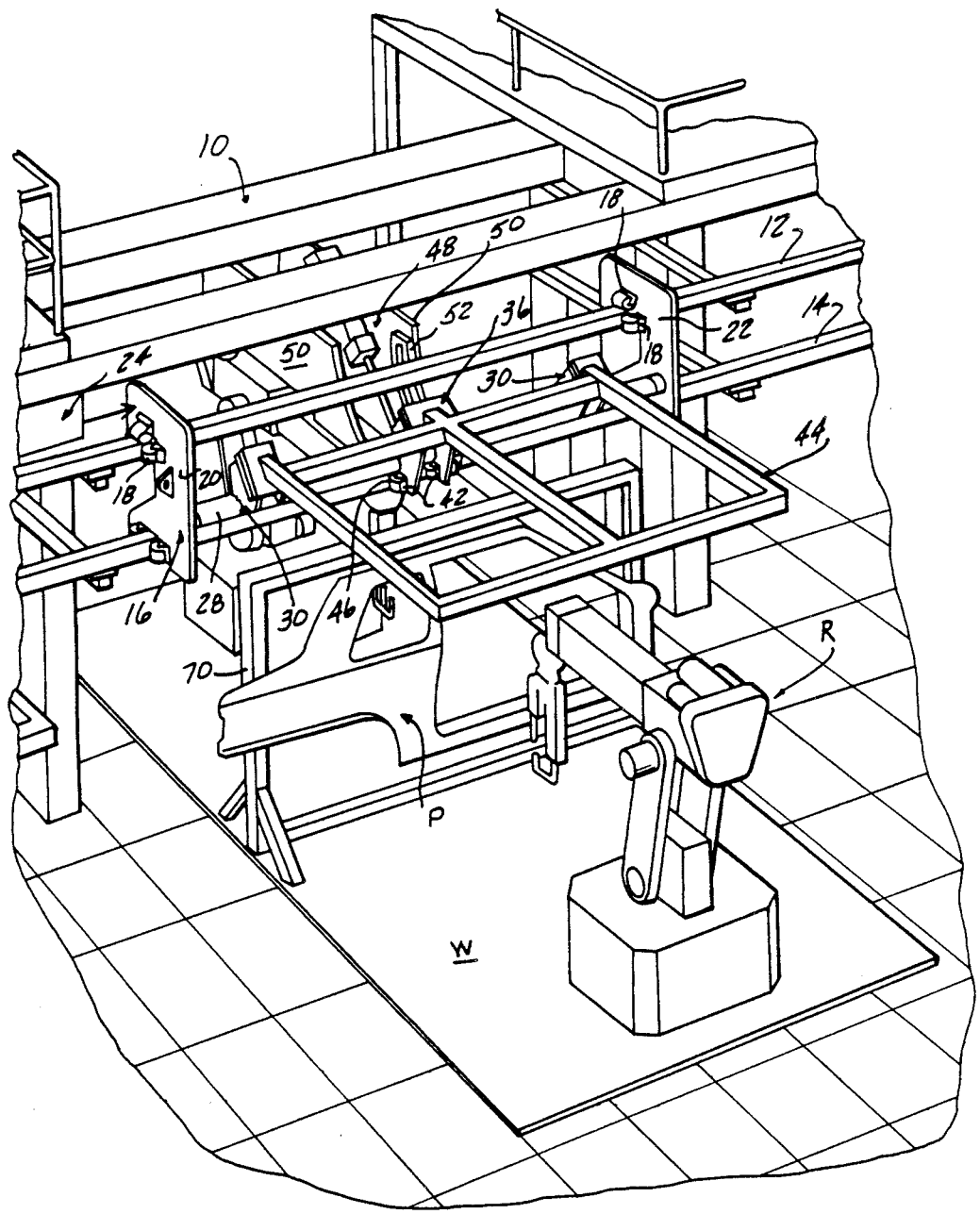
FIG. 1 is a perspective view, with certain parts omitted, of a single work station on a conveyor embodying the present invention.

In FIG. 1 there is shown a perspective view of a single work station of an automotive body side panel assembly line. The purpose of this particular line is to assemble upon the stamped sheet metal body side panel designated generally P various additional parts, such as door lock and hinge reinforcements, mounting brackets, etc. before the panel is fed into a subsequent line where the side panel is assembled to the floor panel, roof panel, etc. to form a unitized vehicle body. By preassembling the various parts to the side panel before the side panel is assembled into the body, access to the desired part locations upon the side panel is greatly facilitated, an important consideration where automated tooling is employed.

Only a single work station is shown in FIG. 1, the manipulating device of the present invention being duplicated at the remaining work stations. Typically, a body side panel sub assembly line will have six or more work stations.

The apparatus shown in the drawings includes a fixed frame designated generally 10 upon which upper and lower parallel conveying rails 12 and 14 are fixedly mounted. Rails 12 and 14 extend the entire length of the assembly line and pass, in the manner shown in FIG. 1, a plurality of separate work stations such as the work station W of FIG. 1 at which various types of automated tooling such as a robotic welder designated generally R are located.

A panel carrier designated generally 16 is mounted, as by roller assemblies 18 mounted on carrier end plates 20, 22, for movement longitudinally along the conveying path defined by rails 12 and 14. Carrier 16 is driven along rails 12 and 14 by an intermittently operable conveyor drive schematically indicated at 24 which advances the carrier in intermittent step by step movement to successive work stations along the line. Only one carrier 16 has been illustrated, however, typically in practice a series of carriers will be linked to each other in a train, the individual carriers being spaced from each other by the distance between adjacent work stations.

Figure 2:
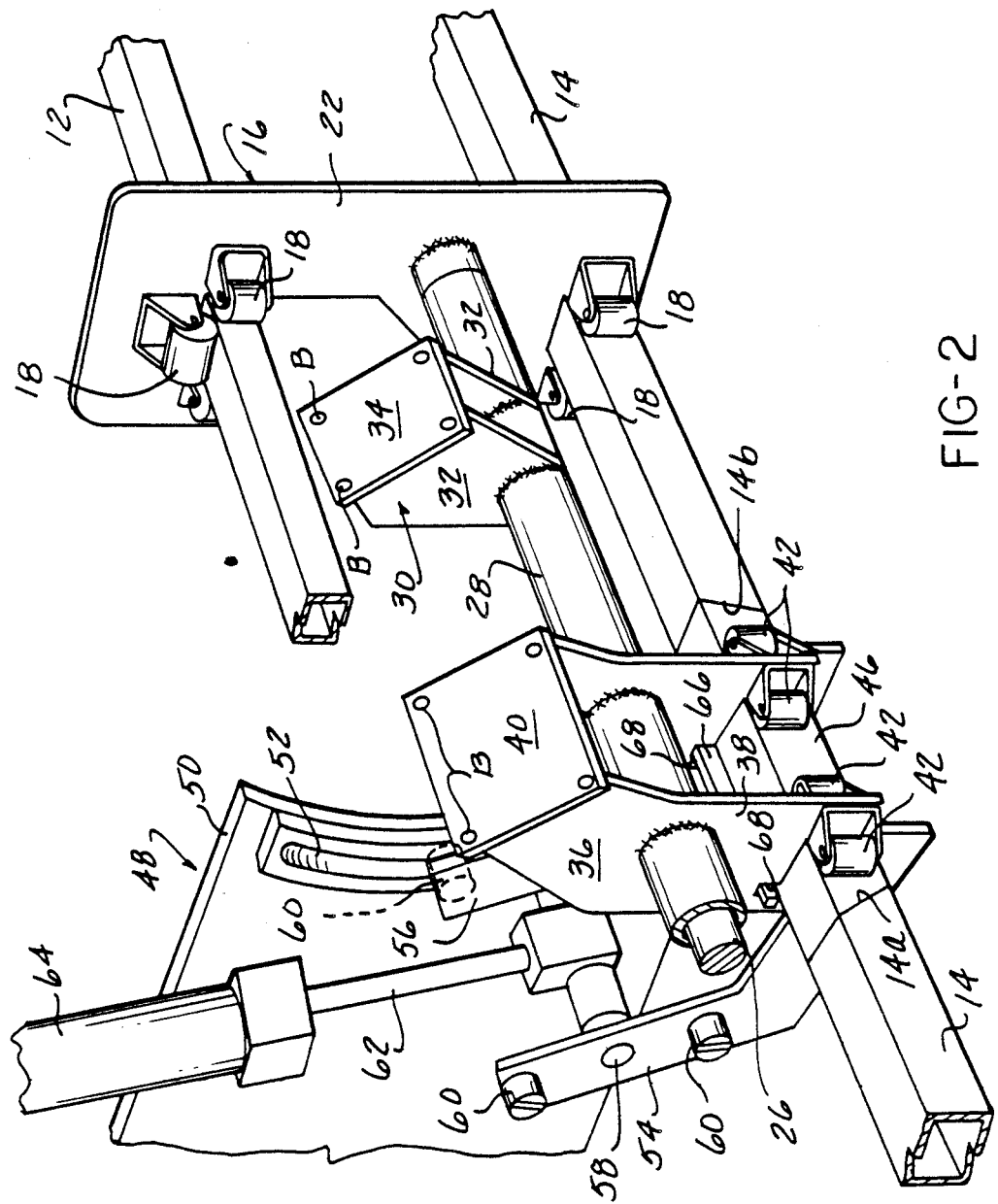
FIG. 2 is a perspective view with certain parts omitted, broken away or partially shown showing details of the manipulator mechanism of the conveyor of FIG. 1.

A rigid pivot shaft 26 (FIGS. 2 and 3) is fixedly secured, as by welding, at its opposite ends to rigidly join the two carrier end plates 20, 22 to each other. Desirably, additional bracing will be coupled between the two end plates, however this additional bracing has not been shown for purposes of clarity. A hollow cylindrical sleeve 28 is rotatively supported upon pivot shaft 26 and fixedly mounts adjacent its opposite ends a pair of support arm assemblies 30. As best seen in FIG. 2, a support arm 30 includes a pair of arm portions 32 welded to the exterior of sleeve 28 which support a mounting pad 34 at their distal ends.

Midway of the length of sleeve 28, a rail gripping assembly designated generally 36 is fixedly secured, as by welding, to sleeve 28. As best seen in FIG. 2, the rail gripping assembly 36 includes a pair of side plates 38 welded to sleeve 28 and projecting from opposite sides of the sleeve. At one end of side plates 38, a mounting pad 40 is fixedly secured to the ends of side plates 38, as by welding, to lie in the same general plane as the mounting pads 34 on the support arm assemblies 30. At the opposite end of each side plate 38, a pair of rollers 42 are mounted upon each side plate 38 to roll along one side of lower conveying rails 14.

Figure 3:
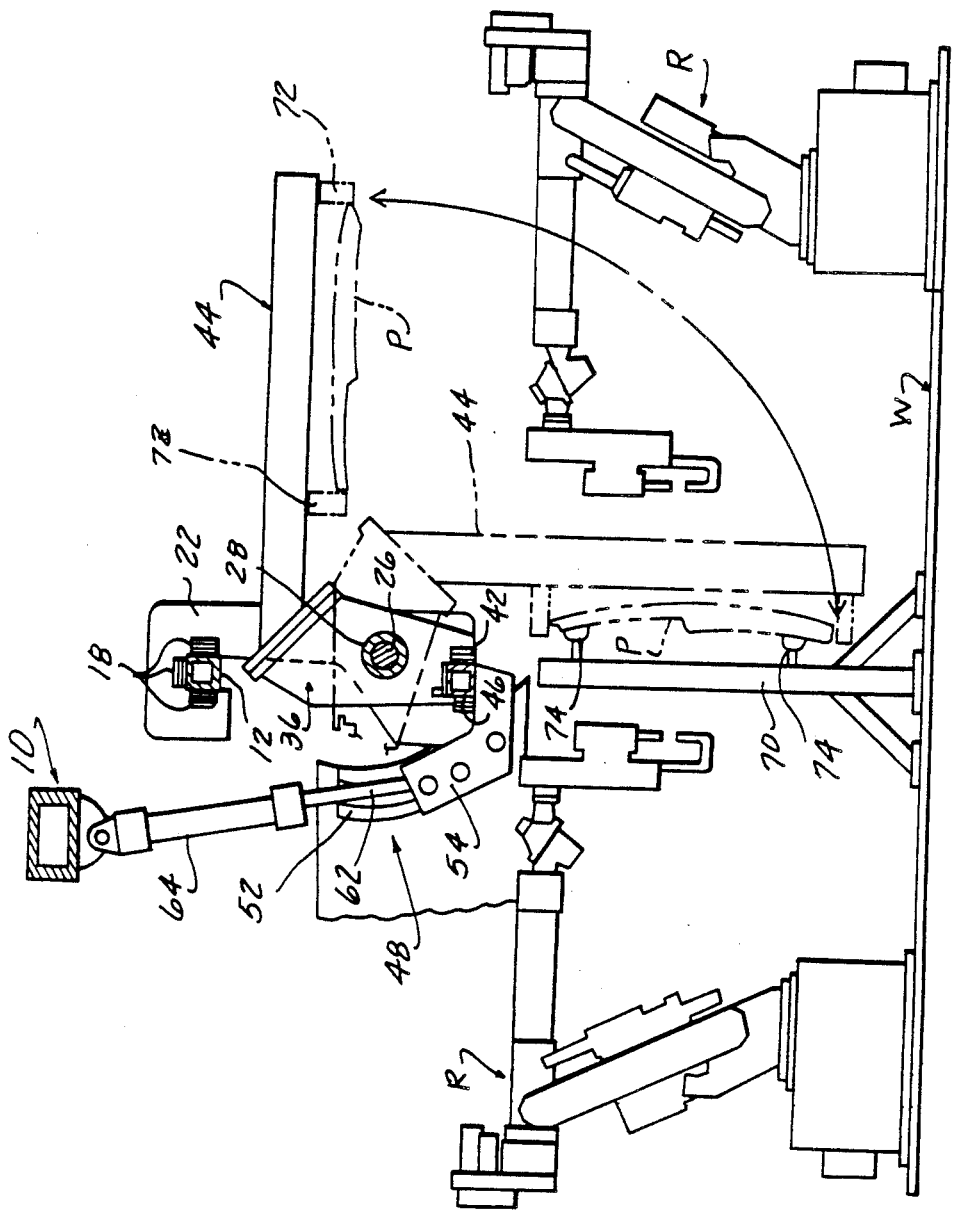
FIG. 3 is a cross sectional view taken in a plane normal to the direction of conveying movement showing details of the work station of FIG. 1.

The mounting pads 34 and support arms assemblies 30 and mounting pad 40 on rail gripper 36 service to support a panel support frame designated generally 44 upon sleeve 28, frame 44 being bolted to the respective mounting pads as through bolt holes B (FIG. 2) formed at suitable locations on the mounting pads. As best seen in FIG. 3, the configuration of the support frame 44 and its relationship to the axis of sleeve 24 is such that the center of gravity of the assembly gravitationally biases sleeve 28 in a clockwise direction as viewed in FIG. 3 about the axis of pivot shaft 26, hence rollers 42 need engage only one side of lower rail 14 to maintain frame 44 in its elevated conveying position.

Referring now particularly to FIG. 2, lower rail 14 is not continuous, but consists of main sections which terminate at ends illustrated at 14a and 14b in FIG. 2 to leave a gap in the lower rail at each work station. Normally, a relatively short rail section 46 is positioned to fit between the ends 14a, 14b of the main rail sections 14 to bridge the gap between the main rail sections 14 and define a substantially continuous lower rail.

The relatively short rail section 46 forms part of a support frame manipulator designated generally 48 which is employed to pivot the panel support frame 44 between the position shown in full line in FIG. 3 and the position indicated in broken line in FIG. 3.

Referring to FIG. 1, manipulator 48 includes a pair of rigid side plates 50 which are fixedly mounted on conveyor frame 10. A pair of cam tracks 52 curved along a radius from the axis of pivot shaft 26, are fixedly mounted on the inner sides of each of manipulator frame side plates 50.

Referring now to FIG. 2, the relatively short rail section 46 is fixedly secured to a pair of rigid arms 54, 56 which are in turn also rigidly interconnected with each other by a pivot shaft 58. Arms 54, 56 each carry a pair of cam track engaging rollers 60 which are received in cam tracks 52 to guide the rigid assembly defined by the relatively short rail section 46, arms 54, 56 and shaft 58 in movement. This sub assembly is driven in movement by the piston rod 62 of a hydraulic cylinder 64 mounted on the fixed frame 10 (FIG. 3), piston rod 62 being pivotally coupled to shaft 58. A key 66 best seen in FIG 2 is fixedly mounted upon the relatively short rail section 46 to project into slots 68 in the slide frame members 38 of rail gripper 36 to rotatively lock gripper 36 to rail section 46 and cause gripper 36 to pivot upon shaft 26 in response to retraction and extension of piston rod 62 from cylinder 64.

As best seen in FIG. 3, pivotal movement of rail gripper 36 induced by actuation of piston rod 62 is employed to pivot support frame 44 between a generally horizontal position shown in full line in FIG. 3, which will be referred to as a conveying position, and a lowered or transfer position indicated in broken line in FIG. 3 in which a body side panel P carried by the panel support frame 44 is located in a position in which support of the panel P carried by support frame 44 may be transferred to a stationary work support frame 70 located at work station W. Panel P is held upon panel support frame 44 by releasable clamps schematically indicated at 72 and may be supported upon the stationary work frame 70 as by suitable clamps or vacuum cups schematically indicated at 74. The clamps or holders 72, 74 may be actuated manually, but preferably are actuated by tripping devices, not shown, engageable between the panel support frame and stationary work frame as the panel support frame moves to its transferred position.

Similarly, the control of the drive which moves carrier 16 along conveying rails 12 and 14 may be actuated either by regulating the drive to operate in intermittent step by step movement in which the carrier 16 is advanced an accurately regulated distance during each step of movement or by a position sensing device responsive to the position of carrier 16 along the conveyor. In either case, the objective is to stop the carrier with rail gripper 36 centered midway between the ends of the relatively short rail section 46 as illustrated in FIG. 2.

During movement of carrier 16 along rails 12 and 14, the piston rod 64 of the hydraulic cylinder is maintained in its extended position so that rail section 46 of the manipulator assembly is positioned in the gap between two adjacent lower rail sections 14 as shown in FIG. 2. As the carrier 16 approaches a work station, the lower rail engaging rollers 18 at the leading end of the carrier will roll smoothly from he down stream rail section 14 across rail section 46 of the manipulator and into engagement with the next main rail section 14.

During this movement, the rollers 42 of the manipulator bear against the sides of the rail sections 14, 46 to hold the panel support frame 44 in the conveying position shown in FIGS. 1 and 3 in which a panel P supported on the lower side of the support frame is carried well clear of any tooling. Upon arrival at the work station, carrier 16 is stopped with its rail gripper 36 engaged with rail section 46. Cylinder 64 is then actuated to retract its piston rod 62 and the rail gripper is pivoted about pivot shaft 26 as guide rollers 60 of the manipulator ride upwardly along the curved cam track 52. This pivotal movement of the manipulator pivots support frame 44, which is fixedly attached to the sleeve 28, downwardly as indicated by the broken line showing of FIG. 3. Any tooling, such as the robotic welder R will be retracted clear of the path of movement of the support frame until after the panel P has been transferred from support frame 44 to work frame 70 and support frame 44 swung back upwardly to its conveying position by a subsequent extension of piston rod 62.

After a work operation has been performed upon the panel P while supported on work frame 70, the tooling is retracted, piston rods 62 is again retracted to pivot support frame 44 back downwardly to pick up the panel P. The support frame is then returned upwardly back to the full line position of FIG. 3 with the panel P supported thereon by a subsequent extension of piston rod 62. The conveyor drive is then actuated to advance the carrier to the next work station.

The arrangement disclosed enables a fairly precise positioning of the panel P upon the work support frame merely by an initial set up alignment of the work frame 70 to a support frame 44 when the support frame is in its lowered or transfer position. Accurate and precise alignment of the conveyor rails 12 and 14 is not essential in that the manipulator may be readily aligned at the desired position relative to the lower rail during assembly of the conveyor. The panel P is accurately positioned upon the support frame 44 by the clamps which hold the panel to the support frame, and this alignment is preserved during the transfer of the panel P to the work frame.

Due to manufacturing tolerances, the position of a panel P on a support frame 44 may vary slightly, particularly from carrier to carrier. However, where precise placement of a part on a panel P relatively to the tooling at a work station is essential, the tooling normally will be provided with a positioning device which will adjust the tooling during its approach to the panel to a precise position as determined by orienting the tooling to some fixed reference point on the panel itself.

While one embodiment of the invention has been described in detail, it will be apparent to those skilled in the art the disclosed embodiment may be modified. Therefore, the foregoing description has to be considered exemplary rather than limiting, and the true scope of the invention is that defined in the following claims.

What is claimed is:

1. Article handling apparatus comprising a pair of first and second spaced parallel elongate conveying rails defining a fixed conveying path, one of said rails including a movable rail section, manipulator means operable to move said movable rail section between a first position wherein said section is aligned with and functions as a portion of said one of said rails and a second position wherein said section is located in displaced parallel offset relationship from said first position, an article carrier mounted on said rails for movement along said fixed conveying path, an article support frame mounted on said carrier for movement relative to said carrier between a conveying position and a transfer position, rail gripping means fixedly secured to said support frame and slidable along said one of said rails for locating said support frame in its conveying position when said gripping means is located on the fixed portions of said one of said rails and being operable when located on said rail section to move said support frame relative to said carrier between said conveying position and said transfer position in response to movement of said rail section between its first and second positions.

2. The invention defined in claim 1 wherein said carrier includes an elongate main carrier frame supported at its opposite ends on said rails, said movable rail section being of a length substantially less than that of sd main frame whereby said main frame may be supported on said rails with said rail section located midway between the ends of said main frame, and mounting means mounting said support frame upon said main frame for pivotal movement relative to said main frame about an axis parallel to said rails, said manipulating means comprising means for driving said rail gripping means in pivotal movement about said axis when said gripping means is engaged with said rail section.

3. The invention defined in claim 2 wherein said mounting means comprises an elongate pivot shaft fixedly mounted on said carrier, an elongate sleeve rotatably received upon said shaft, and means fixedly mounting said support frame and rail gripping means upon said sleeve.

4. The invention defined in claim 2 wherein said manipulating means comprises a manipulator frame fixedly mounted with respect to said conveying rails, a movable frame mounted on said manipulator frame for movement along a fixed path between opposite end limits of movement, means fixedly mounting said rail section on said movable frame, and power means for driving said movable frame between said opposite end limits of movement.

5. The invention defined in claim 1 wherein said carrier comprises an elongate carrier frame including end frame members at each end of said carrier, roller means on each end frame member of said carrier frame operatively engaged with said conveying rails to support and guide said carrier frame upon said rails for movement along said conveying path, an elongate rigid pivot shaft fixedly secured at its opposite ends to the respective end frame members, an elongate hollow sleeve rotatably received on said pivot shaft, means fixedly mounting said support frame upon said sleeve for rotation with said sleeve, means fixedly mounting said rail gripping means upon said sleeve, said rail gripping means including a rigid arm portion projecting radially from said sleeve, and rail engaging means adjacent the radially outer end of said arm means engaged with said one of said rails to limit movement of said gripping means relative to said one of said rails to movement longitudinally of said one of said rails.

6. The invention defined in claim 5 wherein said support frame when in its conveying position gravitationally biasses said sleeve in rotation in a first direction, and said rail engaging means comprises roller means engaged with said one of said rails to limit rotation of said sleeve in said one direction to establish said conveying position.

7. The invention defined in claim 6 wherein said rail engaging means comprises means defining a key receiving slot extending parallel to said axis, and a key fixedly mounted on and extending longitudinally of said rail section and engageable within said slot to positively couple said gripping means to said rail section during movement of said rail section between its first and second positions.

8. The invention defined in claim 7 wherein said manipulator means comprises first rigid frame means fixedly secured to and projecting from said rial section, a plurality of rollers mounted on said first frame means for rotation about respective axes parallel to said pivot shaft, fixedly mounted guide track means engaged with said rollers for guiding said first frame means in movement along a fixed transfer path to guide said rail sections in movement to and from said first end second positions, and motor means for driving said first frame means in movement along said transfer path.

9. Article handling apparatus comprising fixed frame means, a carrier mounted on said frame means for movement along a fixed conveying path, article support means for detachably supporting an article, mean mounting said article support means upon said carrier for movement therewith along said conveying path and for movement relative to said carrier between a conveying position and a transfer position, manipulating means mounted on said frame means at a first location on said path, said manipulating means including a manipulator member mounted for movement between a first position wherein said member is located on said conveying path and a second position wherein said member is displaced from said path, drive means for driving said member in movement between said first and second positions, and gripping means fixedly mounted upon said support means engageable with said member when said carrier is at said first location to couple said support means to said member to move said support means relative to said carrier between said conveying and transfer positions in response to movement of said member between said first and second positions.

10. The invention defined in claim 9 wherein said frame comprises a pair of like elongate conveying rails mounted in longitudinal alignment with each other with adjacent ends in longitudinally spaced relationship to each other at said first location, said carrier being mounted upon said rails for movement along said conveying path, and said manipulator member comprises a conveying rail section located on longitudinal alignment with and extending between said adjacent ends of said conveying rails when said member is in said first position.

11. The invention defined in claim 10 wherein said carrier includes first and second roller means mounted on said rails and spaced from each other longitudinally of said rails by a distance greater than the space between said adjacent ends to support said carrier on both of said pair of rails when said carrier is at said first location.

12. The invention defined in claim 10 wherein said means for mounting said support means on said carrier comprises an elongate shaft fixedly mounted on said carrier and extending parallel to said rails and an elongate sleeve rotatably received upon said shaft, said support means being fixedly mounted upon said sleeve for rotation therewith upon said shaft between said conveying and transfer positions, said gripping means being fixedly mounted on said shaft and slidably engageable with said rails to maintain said support frame in said conveying position during movement of said carrier along said conveying path.

* * * * *